United States Patent
Liang et al.

(10) Patent No.: US 8,489,046 B2
(45) Date of Patent: Jul. 16, 2013

(54) SIGNAL DECOMPOSITION METHODS AND APPARATUS FOR MULTI-MODE TRANSMITTERS

(75) Inventors: Paul Cheng-Po Liang, Santa Clara, CA (US); Koji Takinami, Saratogoa, CA (US)

(73) Assignee: Panasonic Corporation, Osaka (JP)

( * ) Notice: Subject to any disclaimer, the term of this patent is extended or adjusted under 35 U.S.C. 154(b) by 1394 days.

(21) Appl. No.: 12/176,570

(22) Filed: Jul. 21, 2008

(65) Prior Publication Data

US 2010/0015932 A1     Jan. 21, 2010

(51) Int. Cl.
*H01Q 11/12*      (2006.01)
*H04B 1/04*       (2006.01)

(52) U.S. Cl.
USPC ........ 455/127.1; 455/102; 455/108; 455/110; 330/10

(58) Field of Classification Search
USPC ....................................... 455/91–129; 330/10
See application file for complete search history.

(56) References Cited

U.S. PATENT DOCUMENTS

| | | | |
|---|---|---|---|
| 6,987,417 B2 * | 1/2006 | Winter et al. | 330/10 |
| 7,043,213 B2 * | 5/2006 | Robinson et al. | 455/127.2 |
| 7,068,984 B2 * | 6/2006 | Mathe et al. | 455/126 |
| 7,333,780 B2 * | 2/2008 | Udagawa et al. | 455/126 |
| 7,346,122 B1 * | 3/2008 | Cao | 375/296 |
| 7,493,091 B2 * | 2/2009 | Matsuura et al. | 455/91 |
| 7,496,333 B2 * | 2/2009 | Matsuura et al. | 455/108 |
| 7,873,333 B2 * | 1/2011 | Tanaka et al. | 455/126 |
| 7,881,399 B2 * | 2/2011 | Matsuura | 375/295 |
| 7,884,681 B1 * | 2/2011 | Khlat et al. | 332/149 |
| 7,991,074 B2 * | 8/2011 | Nentwig | 375/297 |
| 8,050,352 B2 * | 11/2011 | Schell et al. | 375/296 |
| 8,050,637 B2 * | 11/2011 | Shimizu et al. | 455/114.3 |
| 8,095,093 B2 * | 1/2012 | Takinami et al. | 455/127.1 |
| 2003/0092405 A1 * | 5/2003 | Groe et al. | 455/108 |
| 2004/0219891 A1 * | 11/2004 | Hadjichristos | 455/102 |
| 2004/0266366 A1 * | 12/2004 | Robinson et al. | 455/91 |
| 2005/0110568 A1 | 5/2005 | Robinson et al. | |
| 2006/0038710 A1 * | 2/2006 | Staszewski et al. | 341/143 |

(Continued)

OTHER PUBLICATIONS

Paul Cheng-Po Liang, et al., U.S. Appl. No. 12/008,132, entitled, A Multiple-Mode Modulator to Process Baseband Signals, filed Dec. 8, 2008.

(Continued)

*Primary Examiner* — Edward Urban
*Assistant Examiner* — Rui Hu (57) ABSTRACT

A multi-mode communications transmitter includes a signal decomposer that converts rectangular-coordinate in-channel and quadrature channel signals into polar-coordinate amplitude and angle component signals and form therefrom first and second modulation signals. The signal decomposition process performed by the signal decomposer combines envelope-reduction and restoration (ERR) with filtering to reduce the bandwidths of the first and second modulation signals compared to the bandwidths of the unmodified amplitude and angle component signals. The reduction in signal bandwidths eases the design requirements of the electrical components needed to process and generate the signals applied to the power supply and radio frequency (RF) input ports of the multi-mode communications transmitter's power amplifier (PA). It also makes the multi-mode communications transmitter more forgiving to gain and delay mismatches between the signals applied to the power supply and RF input ports of the PA, compared to conventional polar modulation transmitters.

13 Claims, 10 Drawing Sheets

U.S. PATENT DOCUMENTS

| | | | | |
|---|---|---|---|---|
| 2007/0142000 | A1* | 6/2007 | Herzinger | 455/91 |
| 2009/0004981 | A1* | 1/2009 | Eliezer et al. | 455/127.1 |
| 2009/0023402 | A1* | 1/2009 | Shimizu et al. | 455/102 |
| 2009/0111397 | A1* | 4/2009 | Dunsmore et al. | 455/108 |
| 2009/0161793 | A1* | 6/2009 | Nentwig | 375/297 |
| 2009/0325494 | A1* | 12/2009 | Staszewski et al. | 455/43 |

OTHER PUBLICATIONS

J.K. Jau, et al., Highly Efficient Multimode RF Transmitter Using the Hybrid Quadrature Polar Modulation Scheme, Microwae Symposium Digest, IEEE MTTS-S International, 2006, pp. 789-792.

* cited by examiner

SIGNAL DECOMPOSITION METHODS AND APPARATUS FOR MULTI-MODE TRANSMITTERS

FIELD OF THE INVENTION

The present invention relates to communications transmitters. More specifically, the present invention relates to methods and apparatus for reducing signal bandwidths in multi-mode communications transmitters.

BACKGROUND OF THE INVENTION

Conventional communications transmitters employ a quadrature modulator to modulate information to be transmitted, such as voice or data, onto a radio frequency (RF) carrier signal that is capable of being transmitted through the atmosphere to a remote receiver.

Figure 1:
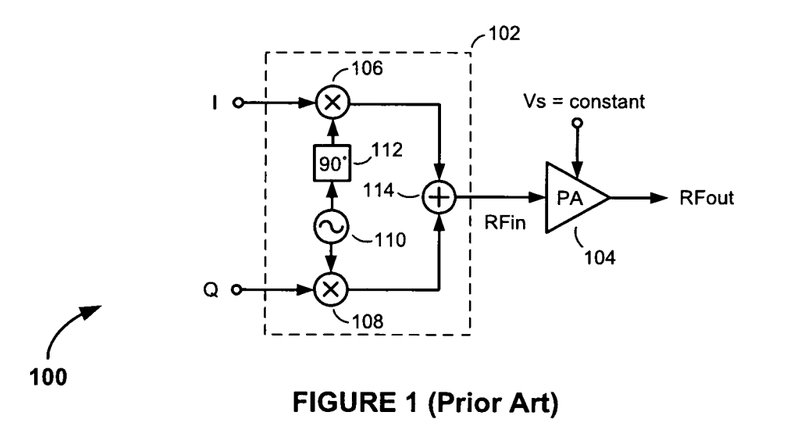
FIG. 1 is a simplified drawing of a conventional quadrature-modulator-based transmitter.

FIG. 1 is a simplified drawing of a conventional quadrature-modulator-based transmitter 100. The quadrature-modulator-based transmitter 100 comprises a quadrature modulator 102 and a power amplifier (PA) 104. The quadrature modulator 102 includes in-phase (I) and quadrature phase (Q) mixers 106 and 108, a local oscillator (LO) 110, a ninety-degree phase shifter 112 and a summer 114.

The I mixer 106 operates to modulate an I signal onto a radio frequency (RF) carrier signal generated by the LO 110 while the Q mixer 108 operates to modulate a Q signal onto a ninety-degree phase-shifted version of the RF carrier signal. The upconverted I and Q signals are summed by the summer 114 and typically filtered by a band-pass filter (not shown) to create a filtered modulated RF carrier signal. The PA 104 amplifies the band-pass-filtered modulated RF carrier signal to produce the desired modulated RF output signal RFout.

One desirable characteristic of the quadrature-modulator-based transmitter 100 is that the frequency and phase of the RF carrier signal can be modulated simply by manipulating the amplitudes of the I and Q signals. However, a significant limitation is that it is not very power efficient, particularly for communication technologies that employ nonconstant-envelope signals, such as orthogonal frequency division multiplexing (OFDM), and other existing or soon-to-be deployed cellular technologies, such as W-CDMA, High-Speed Packet Access (HSPA) and Long Term Evolution (LTE) communication technologies. To prevent clipping of the signal peaks of these nonconstant-envelope signals in the quadrature-modulator-based transmitter 100, the signal levels must be reduced before being introduced to the PA 104, and the PA 104 must be configured to operate in its linear region of operation. Unfortunately, linear PAs configured to operate at reduced drive levels are not very power efficient. This lack of power efficiency is a major concern, particularly in battery-powered applications such as, for example, cellular handsets.

Figure 2:
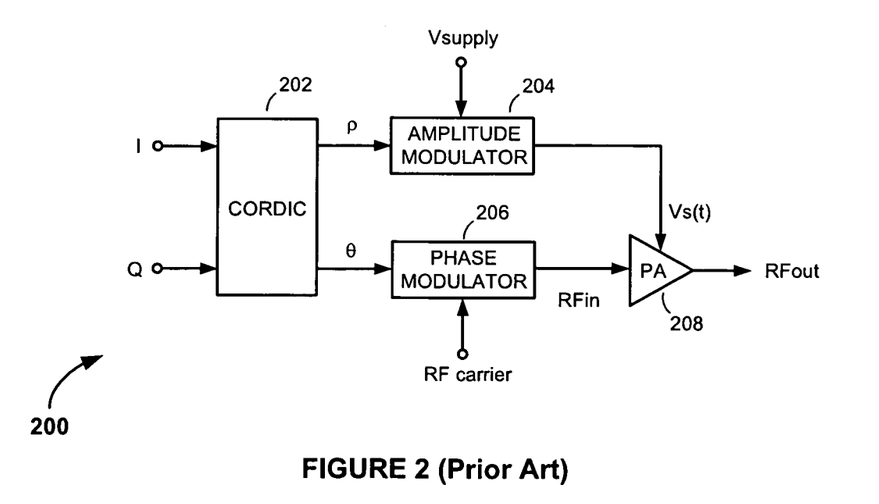
FIG. 2 is a simplified drawing of a typical polar modulation transmitter.

One known way of avoiding the linearity versus power efficiency trade-off of the quadrature-modulator-based transmitter 100 is to employ an alternative type of communications transmitter known as a polar modulation transmitter (also commonly referred to as an envelope-elimination and restoration (EER) transmitter). FIG. 2 is a drawing of a typical polar modulation transmitter 200. The polar modulation transmitter 200 comprises a CORDIC (Coordinate Rotation Digital Computer) converter 202, an amplitude modulator 204 configured in an amplitude path, a phase modulator 206 configured in a phase path, and a PA 208.

During operation, the CORDIC converter 202 converts the rectangular-coordinate I and Q signals into polar-coordinate amplitude and phase component signals $\rho$ and $\theta$. The amplitude modulator 204 modulates a direct current (DC) power supply Vsupply according to amplitude variations in the amplitude component signal $\rho$. The resulting amplitude modulated power supply signal Vs(t) is coupled to the power supply port of the PA 208. Meanwhile, the phase modulator 206 modulates an RF carrier signal in accordance with phase information contained in the phase component signal $\theta$. The resulting phase-modulated RF carrier signal RFin is coupled to the RF input RFin of the PA 208. Because the phase modulated RF carrier signal RFin has a constant envelope, the PA 208 can be configured to operate in its nonlinear region of operation, where it is efficient at converting DC power from the DC power supply Vsupply to RF power at the output of the PA 208. Typically the PA 208 is implemented as a Class D, E or F switch-mode PA 208 operating in compression, so that the output power of the PA 208 is directly controlled by the amplitude modulated power supply signal Vs(t) applied to the power supply port of the PA 208. Effectively, the PA 208 operates as a multiplier, amplifying the constant-envelope phase modulated RF carrier signal according to amplitude variations in the amplitude modulated power supply signal Vs(t), to produce the desired amplitude and phase modulated RF carrier signal RFout.

Although the polar modulation transmitter 200 is significantly more power efficient than the quadrature-modulator-based transmitter 100, it has various drawbacks of its own. First, converting the I and Q signals from rectangular to polar-coordinates often results in substantial bandwidth expansion. Bandwidth expansion is a major concern since the rate at which the polar modulation transmitter's digital signal processing circuitry must process the amplitude and phase component signals $\rho$ and $\theta$ is determined by the bandwidths of the signals. The wider the bandwidths are, the faster the processing rates must be.

The degree to which the bandwidth expands in the rectangular-to-polar conversion process is largely dependent on the modulation format being employed. Nonconstant-envelope modulation formats that have signal trajectories which pass through, or close to, the origin in the I-Q signal plane result in the most severe bandwidth expansion. In fact, a signal trajectory that does pass through the origin results in an instantaneous phase shift of 180 degrees. Not only are such rapid changes in phase difficult to digitally process, they are also difficult to translate to RF. For example, in the phase path, the phase modulator 206, which is responsible for modulating the phase component signal $\theta$ onto the RF carrier signal, is capable of providing a linear response only over a narrowly-defined frequency range and, therefore, is unable to react to abrupt changes in the phase of the phase component signal $\theta$. Bandwidth expansion of signals in the amplitude path can also be problematic. Typically the amplitude modulator 204 comprises a switch-mode converter of some sort. Accurate tracking of the amplitude component signal $\rho$ requires that the switching frequency be about twenty to fifty times higher than the signal envelope bandwidth. Given that the switching transistors in state-of-the-art switch-mode converters can only be switched up to a maximum of about 5 MHz, the bandwidth of the amplitude component signal $\rho$ is often a problem that must be addressed.

Another drawback of the polar modulation transmitter 200 involves the timing of the amplitude and phase component signals $\rho$ and $\theta$. Because the amplitude and phase component signals $\rho$ and $\theta$ are processed in different paths using different components and at different processing rates, a delay mismatch typically arises between the signals at the RF input and supply ports of the PA 208. This delay mismatch results in spectral regrowth, a highly undesirable condition that impairs the ability of the polar modulation transmitter 200 to comply with out-of-band noise limitation standards.

Considering the foregoing limitations and drawbacks of existing communications transmitters, it would be desirable to have methods and apparatus for transmitting communications signals that are not only power efficient but which also avoid the difficulties of processing wide bandwidth signals.

SUMMARY OF THE INVENTION

Methods and apparatus for reducing signal bandwidths in multi-mode communications transmitters are disclosed. An exemplary multi-mode communications transmitter includes a signal decomposer configured to convert rectangular-coordinate in-channel and quadrature channel signals into polar-coordinate amplitude and angle component signals and form therefrom first and second modulation signals, either or both of which has or have a reduced bandwidth compared to a bandwidth or bandwidths of either or both of said polar-coordinate first and second modulation signals. The first modulation signal is used to form a power supply signal, which is coupled to the power supply port of the multi-mode communication transmitter's power amplifier (PA). The second modulation signal is used to form a modulated RF signal, which is coupled to the radio frequency (RF) input port of the PA.

According to one aspect of the invention, the multi-mode communications transmitter is configured to perform an envelope-reduction and restoration (ERR) process. The signal decomposer performs the reduction part of the ERR process by detecting times when amplitude information represented in the amplitude component signal exceed a predetermined amplitude threshold and then distributing the amplitude information exceeding and falling below the predetermined amplitude threshold between the first and second modulation signals. Amplitude information in the amplitude component signal determined to exceed the predetermined amplitude threshold is distributed to (i.e., is used to predistort) the first modulation signal, while amplitude information falling below the predetermined amplitude threshold is used to predistort the second modulation signal.

According to another aspect of the invention, the signal decomposition process performed by the signal decomposer includes filtering the amplitude information determined to exceed the predetermined amplitude threshold in the process of forming the first modulation signal. In an alternative embodiment, the signal decomposition process also or alternatively includes filtering signals representing the amplitude information falling below the predetermined amplitude threshold in the process of forming the second modulation signal. Including filtering in the signal decomposition process has the effect of reducing the bandwidth of the power supply signal applied to the power supply port of the multi-mode communications transmitter's PA and/or the bandwidth of the modulated RF signal applied to the RF input port of the PA to a greater extent than is possible by application of ERR alone.

The reduction of signal bandwidths achieved by the signal decomposition methods and apparatus of the present invention eases the design requirements of the electrical components needed to process and generate the power supply signal and modulated RF signal applied to the power supply and RF input ports, respectively, of the multi-mode communications transmitter's PA. The reduction in signal bandwidths also makes the multi-mode communications transmitter more forgiving to gain and delay mismatches between the signals applied to the power supply and RF input ports of the PA, compared to conventional polar modulation transmitters.

Further features and advantages of the present invention, including a description of the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 3:
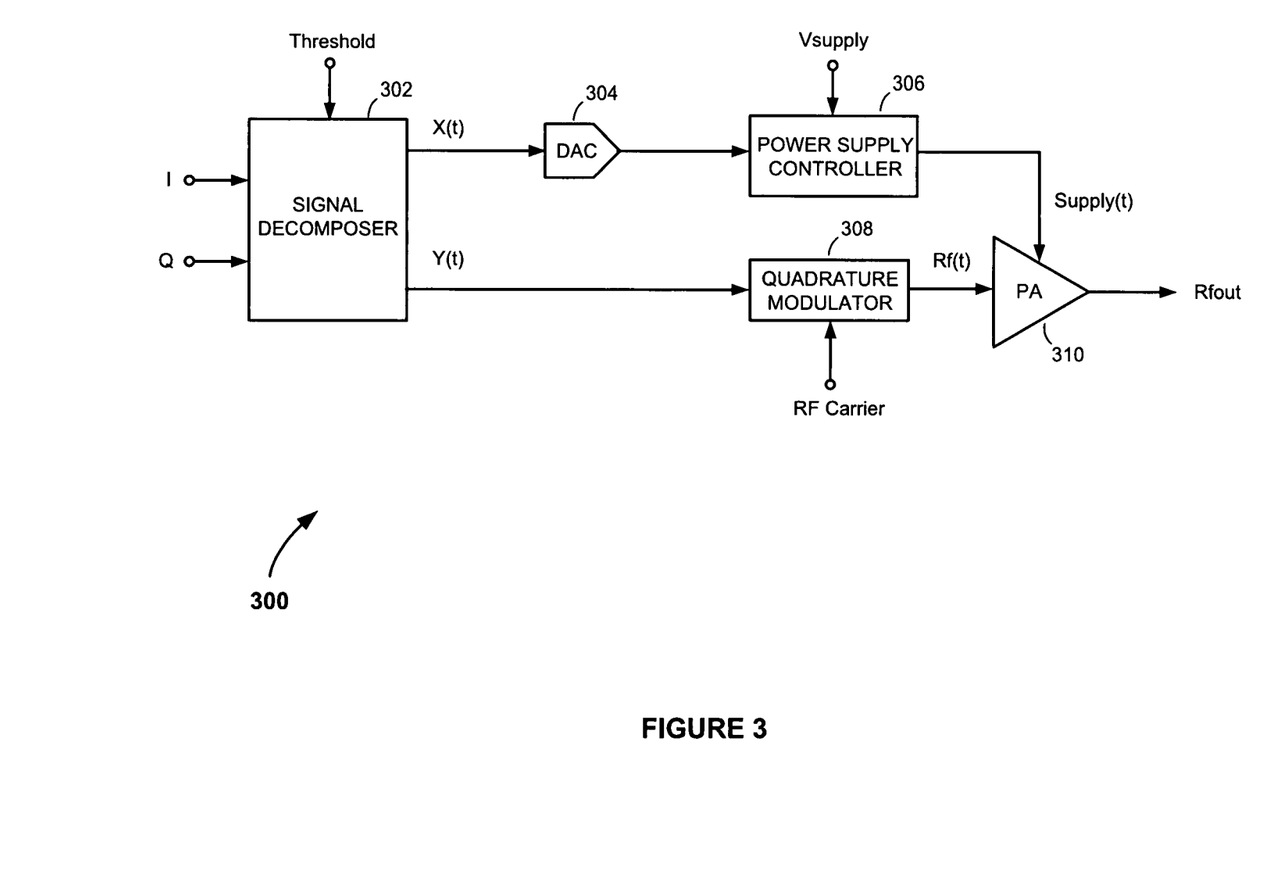
FIG. 3 is a drawing of a multi-mode communications transmitter, according to an embodiment of the present invention.

Referring to FIG. 3, there is shown a multi-mode communications transmitter 300, according to an embodiment of the present invention. The multi-mode communications transmitter 300 comprises a signal decomposer 302; a first modulation path including a digital-to-analog converter (DAC) 304 and power supply controller 306; a second modulation path including a quadrature modulator 308; and a power amplifier (PA) 310.

The signal decomposer 302 operates to convert in-phase (I) and quadrature phase (Q) digital baseband signals to polar-coordinate digital amplitude and phase component signals $Am(t)=\sqrt{I^2+Q^2}$ and $Pm(t)=\tan^{-1}(Q/I)$, which the signal decomposer 302 then decomposes into first and second digital modulation signals X(t) and Y(t) for the first and second modulation paths. As explained below, the decomposition of the amplitude and phase component signals Am(t) and Pm(t) involves distributing the amplitude information represented in the amplitude component signal Am(t) between the first and second digital modulation signals X(t) and Y(t) to achieve a reduction in signal bandwidth compared to the bandwidths of the unmodified amplitude and phase component signals Am(t) and Pm(t).

According to one embodiment of the invention, the signal decomposition process performed by the signal decomposer 302 includes an envelope-reduction and restoration (ERR) operation, similar to that described in copending and commonly assigned U.S. patent application Ser. No. 12/008,132, entitled "A Multi-Mode Modulator to Process Baseband Signals," filed Jan. 8, 2008, which is hereby incorporated by reference. In performing the ERR operation, the signal decomposer 302 detects when the amplitude represented in the amplitude component signal Am(t) exceeds a predetermined amplitude threshold. Amplitude information determined to exceed the amplitude threshold is separated from the amplitude component signal Am(t) and used to predistort the amplitude information in the first modulation signal X(t), while the remaining amplitude information is used to predistort the amplitude information represented in the second modulation signal Y(t). Controlling the relative amplitude information represented in the first and second modulations signals X(t) and Y(t) using ERR has the desirable effect of reducing the signal bandwidth of the power supply signal Supply(t) generated by the power supply controller 306 and applied to the power supply port of the PA 310, and reducing the signal bandwidth of the modulated RF signal Rf(t) generated by the quadrature modulator 308 applied to the RF input port of the PA 310. The reduced bandwidths ease the design requirements of the power supply controller 306. Application of ERR also has the added benefit of lowering the dynamic range of the first modulation signal X(t) compared to the dynamic range of the amplitude component signal Am(t). The reduction in dynamic range further helps to relax the design requirements of the power supply controller 306.

According to one embodiment of the invention, the multi-mode communications transmitter 300 operates in one of three different modes: a quadrature (or "linear") mode, a hybrid (or "product") mode, and a polar mode. Which mode the multi-mode communications transmitter operates in and how the amplitude information in the amplitude component signal Am(t) is distributed between the first and second modulation signals X(t) and Y(t), are determined by the signal envelope amplitude represented in the amplitude component signal Am(t) compared to the amplitude threshold used by the signal decomposer 302 in the signal decomposition process. The signal decomposer 302 performs this function, in accordance with the various modes of operation, so that the amplitude represented in the original amplitude component signal Am(t) is properly restored at the output of the PA 310.

When the signal envelope remains higher than the amplitude threshold within a predetermined time span or over an extended period of time, the multi-mode communications transmitter 300 operates in polar mode, and the signal decomposer 302 operates so that the full envelope information represented in the amplitude component signal Am(t) is distributed to the first modulation signal X(t) while the amplitude information represented in the second modulation signal Y(t) is held to a constant value. When the signal envelope represented in the amplitude component signal Am(t) moves above and below the threshold within a predetermined time span or over an extended period of time, the multi-mode communications transmitter 300 operates in hybrid mode, and the signal decomposer 302 operates to distribute the amplitude information represented in the amplitude component signal Am(t) between the first and second modulation signals X(t) and Y(t). Finally, when the signal envelope represented in the amplitude component signal Am(t) remains below the amplitude threshold within a predetermined time span or over an extended period of time, the multi-mode communications transmitter 300 operates in quadrature mode, and the signal decomposer 302 operates to distribute the amplitude information represented in the amplitude component signal Am(t) into the second modulation signal Y(t) while the first modulation signal X(t) is held to a constant direct current (DC) level.

Following the signal decomposition process, the DAC 304 converts the first digital modulation signal X(t) to an analog signal, which is then coupled to an input of the power supply controller 306. The power supply controller 306 responds by generating a power supply signal Supply(t) for the power supply port of the PA 310 in accordance with the different operating modes. Meanwhile, the second digital modulation signal Y(t) is upconverted to radio frequency (RF) by the quadrature modulator 308. The resulting modulated RF signal Rf(t), which may include both angle and amplitude modulation (depending on the operating mode of the multi-mode communications transmitter 300), is coupled to the RF input port of the PA 310. In generating the final amplitude and angle modulated RF signal RFout, the PA 310 operates to amplify the modulated RF signal Rf(t) and restore the original amplitude information represented in the amplitude component signal Am(t) to the signal at the output of the PA 310.

How the amplitude information is restored at the output of the PA 310 depends on which one of three different operating modes the multi-mode communications transmitter 300 is operating in. When operating in quadrature mode, the PA 310 is biased in its linear region, the power supply signal Supply (t) applied to the power supply port of the PA 310 is held to a constant DC level, and the amplitude at the output of the PA 310 is determined and restored by the amplitude of the modulated RF signal Rf(t) being applied to the RF input port of the PA 310. When configured for operation in hybrid mode, the PA 310 is biased and operates in its saturation region and the output amplitude is determined and restored by the product of the amplitudes of the power supply signal Supply(t) and the modulated RF signal Rf(t) being applied to the power supply port and RF input port of the PA 310. Finally, when configured for operation in polar mode, the PA 310 operates in compression and the amplitude is determined and restored exclusively by the amplitude of the power supply signal Supply(t) being supplied to the power supply port of the PA 310. To correct for the nonlinear response of the PA 310 when operating in either of the hybrid or polar modes, amplitude modulation to amplitude modulation (AM-AM) and/or amplitude modulation to phase modulation (AM-PM) compensation or predistortion techniques can be applied, either using baseband AM-AM and AM-PM predistortion techniques or using dynamic AM-AM and AM-PM compensation techniques, such as described in the aforementioned and incorporated-by-reference U.S. patent application Ser. No. 12/008,132.

Figure 4:
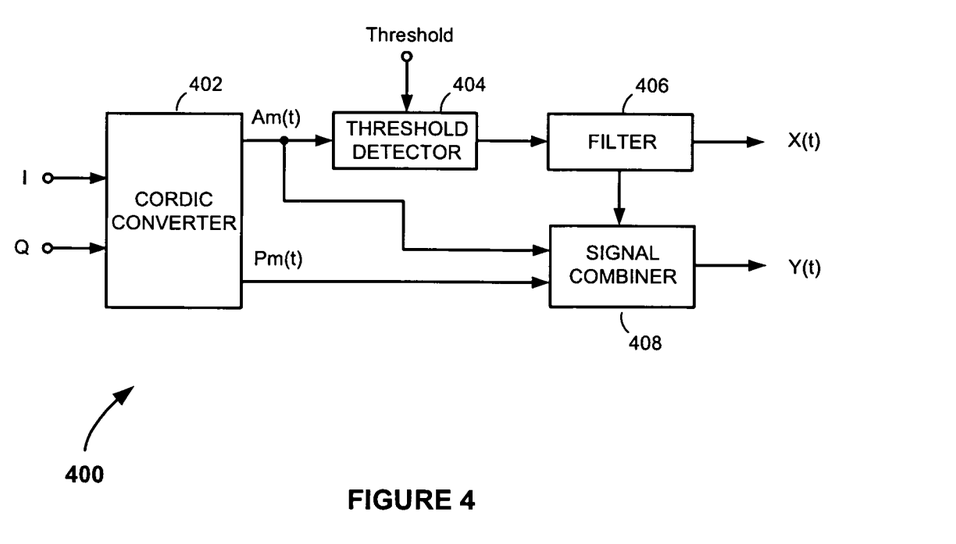
FIG. 4 is a drawing of a signal decomposer that can be used to implement the signal decomposer of the multi-mode communications transmitter in FIG. 3.

FIG. 4 is a drawing of a signal decomposer 400 that can be used to implement the signal decomposer 302 of the multi-mode communications transmitter 300 in FIG. 3, according to an embodiment of the present invention. The signal decomposer 400 comprises a CORDIC (Coordinate Rotation Digital Computer) converter 402, a threshold detector 404, a filter 406, and a signal combiner 408. The CORDIC converter 402 operates to convert the digital I and Q signals to the polar-coordinate digital amplitude and phase component signals Am(t) and Pm(t). The threshold detector 404 monitors the digital amplitude component signal Am(t) for amplitudes that exceed the predetermined amplitude threshold, effectively performing an ERR operation similar to that described above. Amplitude information that exceeds the amplitude threshold is filtered by the filter 406 to produce the first digital modulation signal X(t) for the first modulation path. The signal combiner 408 uses the amplitude information represented in the original amplitude component signal Am(t) and the signal at the output of the filter 406 to derive what the reduced amplitude of the second modulation signal Y(t) needs to be. The signal combiner 408 combines the resulting reduced-amplitude information with the phase modulation information represented in the phase component signal Pm(t) to form the second digital modulation signal Y(t). As will be shown in simulation results below, combining the filtering function with ERR has the desirable effect of reducing the bandwidths of the Supply(t) and Rf(t) signals beyond that which is possible using ERR alone.

Figure 5:
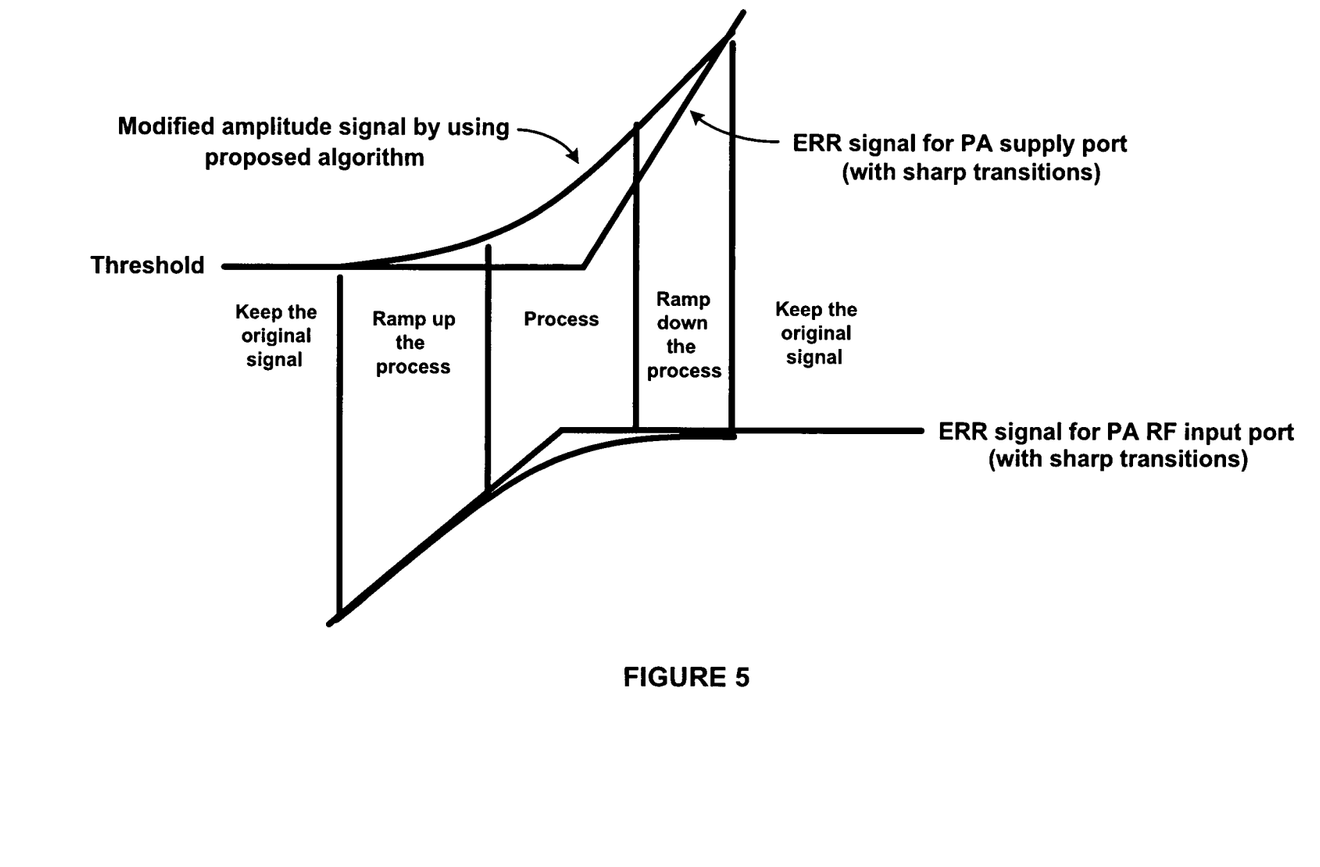
FIG. 5 is a drawing of a filtering algorithm that is employed by the filter of the signal decomposer in FIG. 4, according to one aspect of the present invention.

In the embodiment shown in FIG. 3, signal decomposition is performed in the digital domain and the filter 406 in the exemplary signal decomposer 400 in FIG. 4 comprises a digital filter. The digital filter 406 can be configured to operate according to any suitable filtering algorithm. According to one embodiment, the digital filter 406 comprises a low-pass finite impulse response (FIR) filter configured to operate at all times on the digital signal appearing at the output of the threshold detector 404, in accordance with a predetermined cut-off frequency and roll-off factor. According to another embodiment, illustrated in FIG. 5, the digital filter 406 filter is configured to operate according to a filtering algorithm in which the digital signal appearing at the output of the threshold detector 404 is filtered only during times when sharp transitions are represented in the signal. Ramping up and ramping down the filtering process prior to and following filtering the sharp transitions helps to prevent undesirable filtering of in-band signal components and avoids increasing gain mismatch between the signals applied to the power supply an RF input ports of the PA 310.

Figure 6:
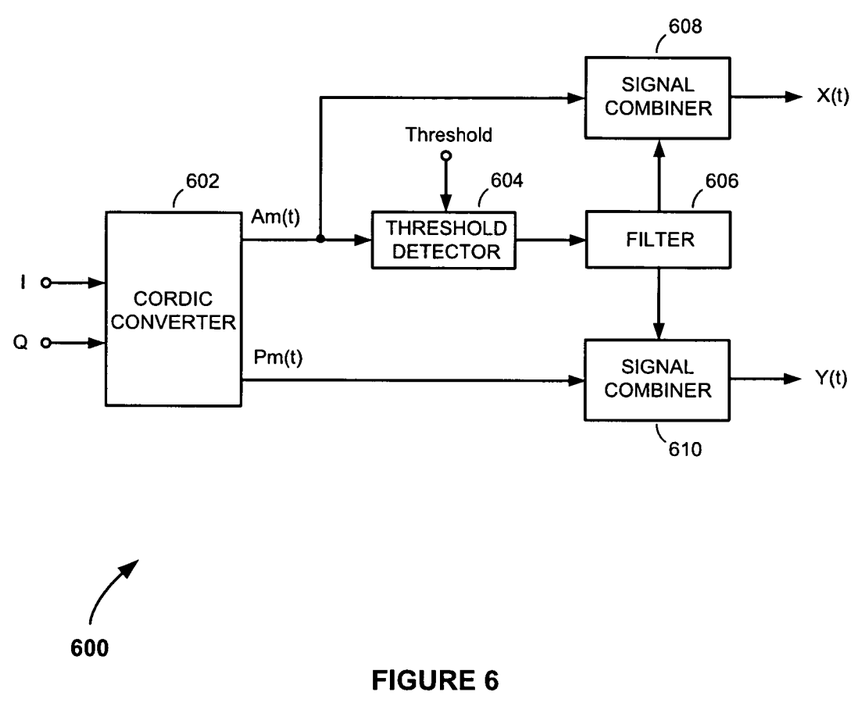
FIG. 6 is a drawing of a signal decomposer that can be used to implement the signal decomposer of the multi-mode communications transmitter in FIG. 3.

The signal decomposer 400 in FIG. 4 achieves bandwidth reduction by combining ERR with filtering of the signals leading to the power supply port of the PA 310. Bandwidth reduction can be also achieved by combining ERR with filtering of the signals leading to the RF input port of the PA 310. This second approach, which is illustrated in FIG. 6, may be used as an alternative to, or in combination with, the approach in FIG. 4. The signal decomposer 600 comprises a CORDIC converter 602, a threshold detector 604, a filter 606, a first signal combiner 608, and a second signal combiner 610. Similar to the signal decomposer 400 in FIG. 4, the CORDIC converter 602 in the signal decomposer 600 in FIG. 6 operates to convert the digital I and Q signals to the polar-coordinate digital amplitude and phase component signals Am(t) and Pm(t) and the threshold detector 604 operates to separate amplitude information from the amplitude component signal Am(t) that exceeds a predetermined amplitude threshold. However, instead of being configured to operate on amplitude information that exceeds the amplitude threshold (as in the approach described in FIG. 4), the filter 606 is configured to operate on amplitude information falling below the amplitude threshold. The filter 606 may comprise a digital FIR filter configured to filter the amplitude information at all times, or, may be configured to filter the amplitude information only during sharp transitions, similar to as the filter 406 employed in the signal decomposer 400 in FIG. 4. The first signal combiner 608 derives what the amplitude of the first modulation signal X(t) should be from the reduced-amplitude information represented in the signal at the output of the filter 606, and forms the first modulation signal X(t) using the derived reduced-amplitude information and the amplitude information represented in the original amplitude component signal Am(t). The second signal combiner 610 derives what the amplitude of the second modulation signal Y(t) should be from the reduced-amplitude information represented in the signal at the output of the filter 606, and forms the second digital modulation signal Y(t) by combining the derived reduced-amplitude information with the phase modulation information represented in the phase component signal Pm(t).

Figure 7:
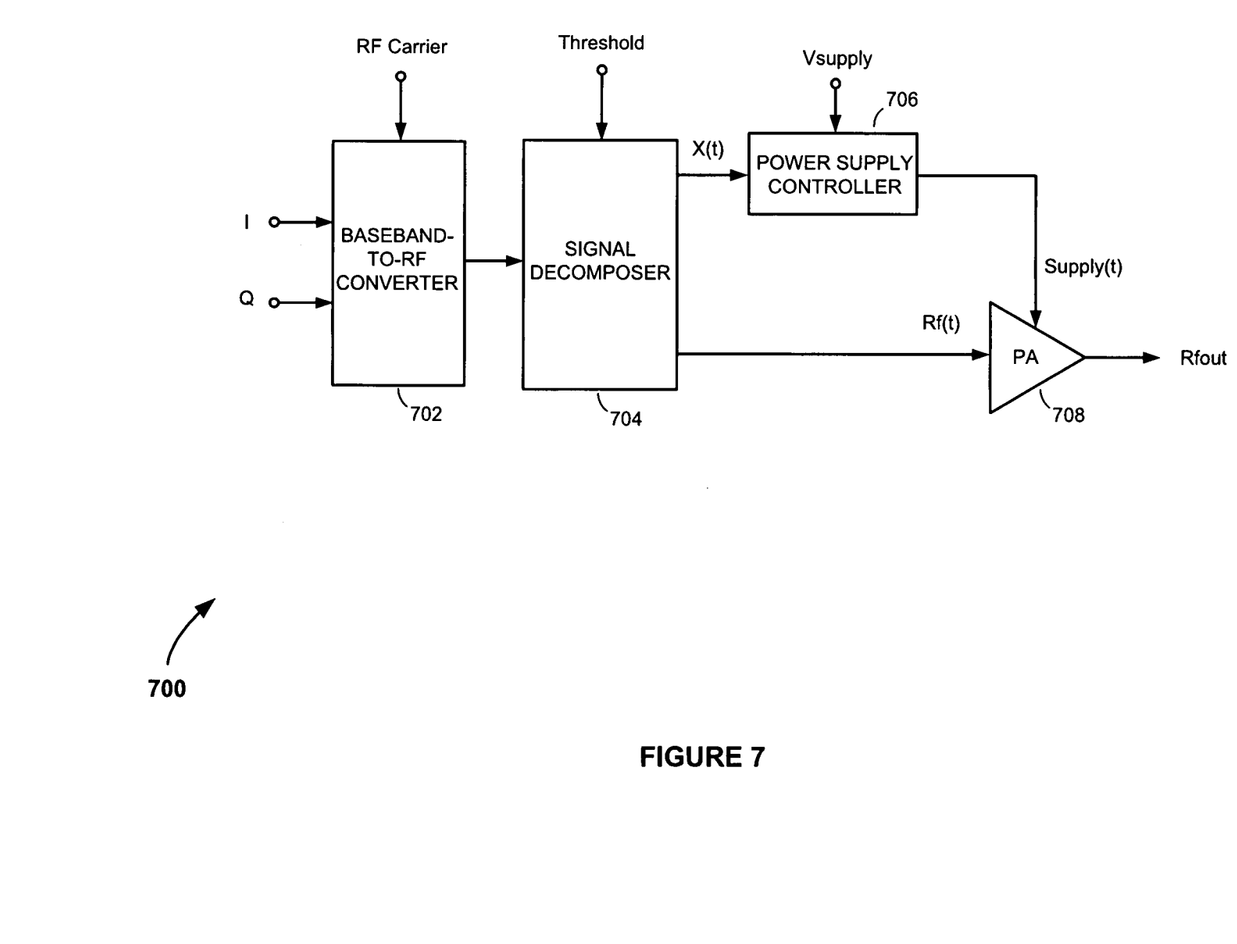
FIG. 7 is a drawing of a multi-mode communication transmitter, according to an embodiment of the present invention.

The signal decomposition and filtering methods and apparatus described in the exemplary embodiments above employ digital processing techniques. Signal decomposition may be alternatively performed using analog processing techniques, either at baseband or at RF. FIG. 7 illustrates, for example, a multi-mode communications transmitter 700 that is configured to perform signal decomposition using analog techniques at RF. The multi-mode communications transmitter 700 comprises a baseband-to-RF converter, a signal decomposer 704, a power supply controller 706, and a PA 708. The baseband-to-RF converter 702 operates to upconvert the modulation in received I and Q signals onto an RF carrier. The signal decomposer 704 receives the modulated RF carrier signal and decomposes it to form the first modulation signal X(t) and the modulated RF signal Rf(t). The signal decomposition method is similar to the signal decomposition method described above, except that it is performed at RF rather than at digital baseband.

Figure 8A:
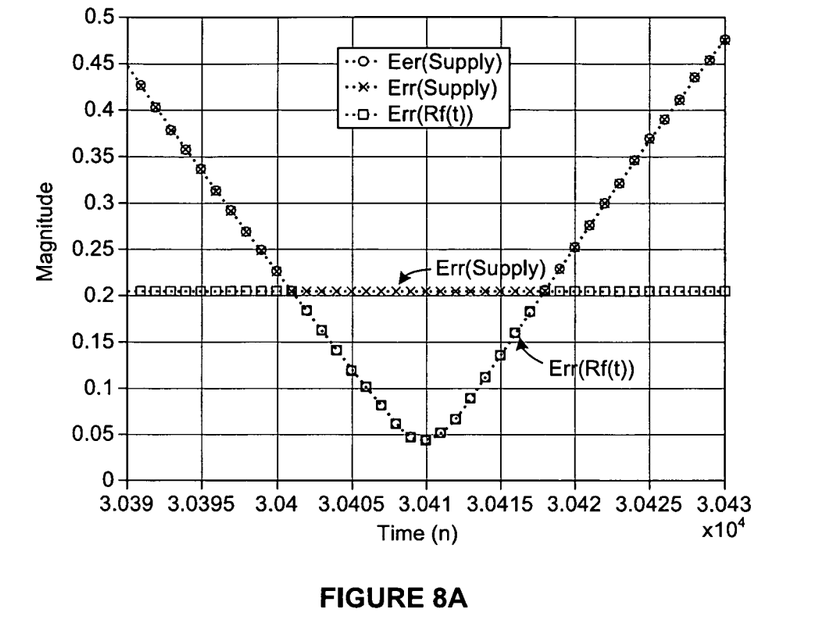
FIGS. 8A and 8B are magnitude versus time simulation diagrams that illustrate how the signal decomposition methods and apparatus of the present invention operate to smooth out high-bandwidth sharp transitions in the signals applied to the power supply port and RF input port of the PA of the multi-mode communications transmitter in FIG. 3.
Figure 8B:
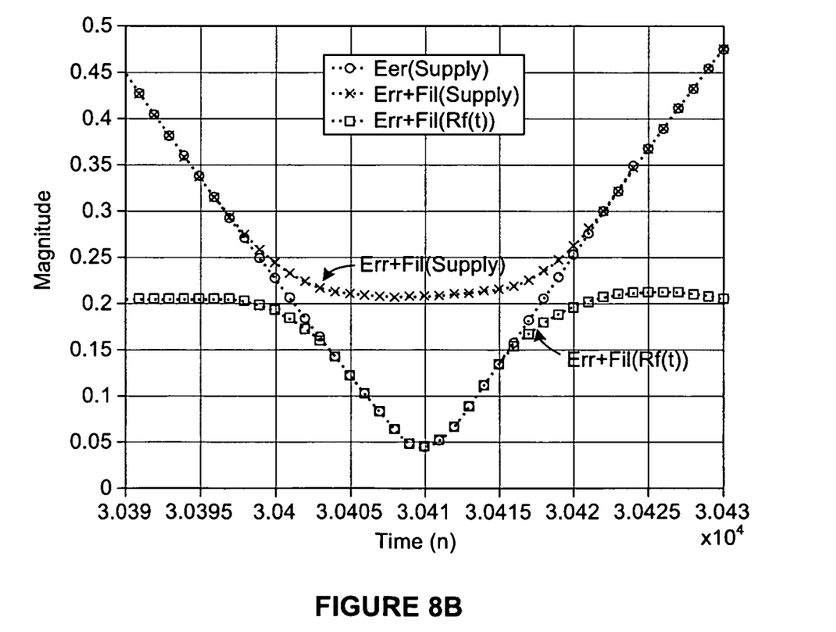

FIGS. 8A and 8B are simulation diagrams demonstrating how including the signal decomposition methods and apparatus of the present invention reduces the bandwidths of the power supply signal Supply(t) and modulated RF signal Rf(t) signals beyond that which is possible using ERR alone. Specifically, FIG. 8A provides a timing diagram of the magnitude of the power supply signal "Err(Supply)" and the magnitude of the modulated RF signal "Err(Rf(t))" generated in a system employing only ERR. FIG. 8B provides a timing diagram of the magnitude of the power supply signal "Err+Fil(Supply)" and the magnitude of the modulated RF signal "Err+Fil(Rf(t))" generated in a system employing both ERR and filtering. Comparing the two figures shows that combining ERR with filtering smoothes out the sharp transitions in both the power supply signal Supply(t) and the modulated RF signal Rf(t) signal occurring between the 3.04 and 3.0405 and 3.0415 and 3.042 time divisions. Filtering the sharp transitions removes high-frequency content from the signals, thereby significantly lowering the bandwidths of the signals applied to the power supply port and RF input port of the PA 310.

Figure 9:
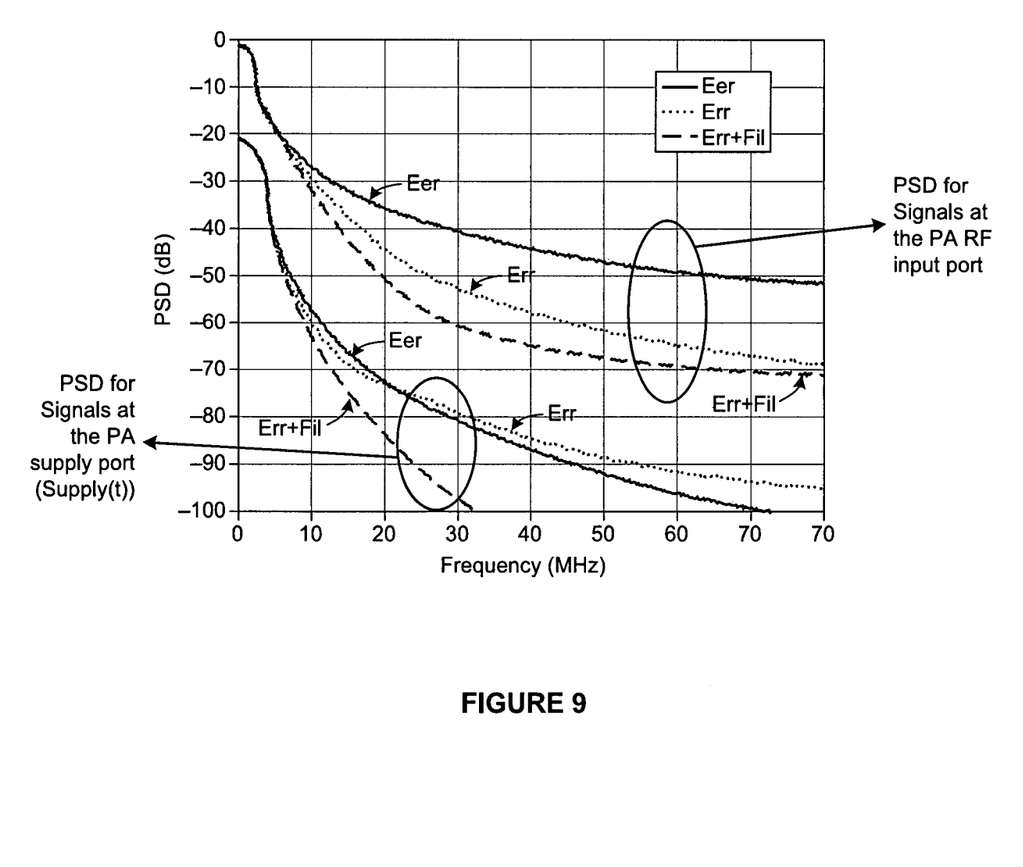
FIG. 9 is a graph comparing simulated power spectral density (PSD) plots of signals applied to the power supply port and RF input port of the PA of the multi-mode communications transmitter in FIG. 3 for: a conventional envelope-elimination restoration (EER) type of communications transmitter, a communications transmitter employing envelope-reduction and restoration (ERR), and a communications transmitter employing the signal decomposition methods of the present invention.

The reduction in signal bandwidths is more directly illustrated in FIG. 9, which is a graph comparing power spectral density (PSD) simulations of signals applied to the power supply port and RF input port of the PA 310 for: 1) a conventional EER type of communications transmitter (curves labeled "Eer"), 2) a communications transmitter employing ERR only (curves labeled "Err"), and 3) a communications transmitter combining ERR with filtering using one of the signal decomposition methods of the present invention described above (curves labeled Err+Fil). As can be seen, the signal bandwidths of the signals applied to both the power supply port and RF input port of the PA 310 in the ERR system are both lower than the signal bandwidths of signals applied to the PA 310 when a conventional EER approach is used. Further bandwidth reduction is seen to be achieved by combining ERR with filtering.

Figure 10:
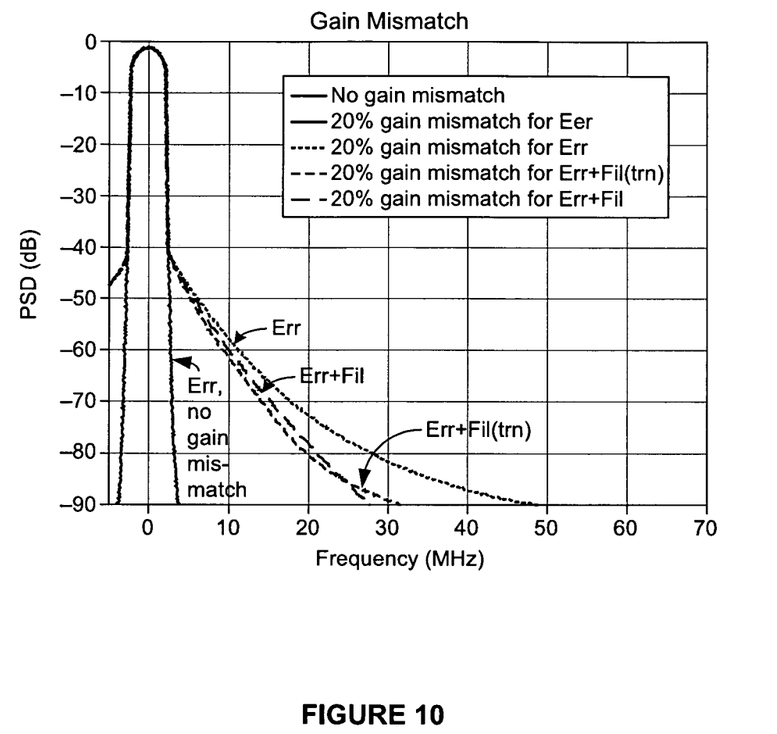
FIG. 10 is a graph comparing the effects of a simulated gain mismatch between signals applied to the power supply and RF input ports of the PA of the multi-mode communications transmitter in FIG. 3 for: a conventional EER-based approach, an ERR approach combined with filtering transitions only (as in FIG. 5 above), and an ERR approach combined with filtering at all times.
Figure 11:
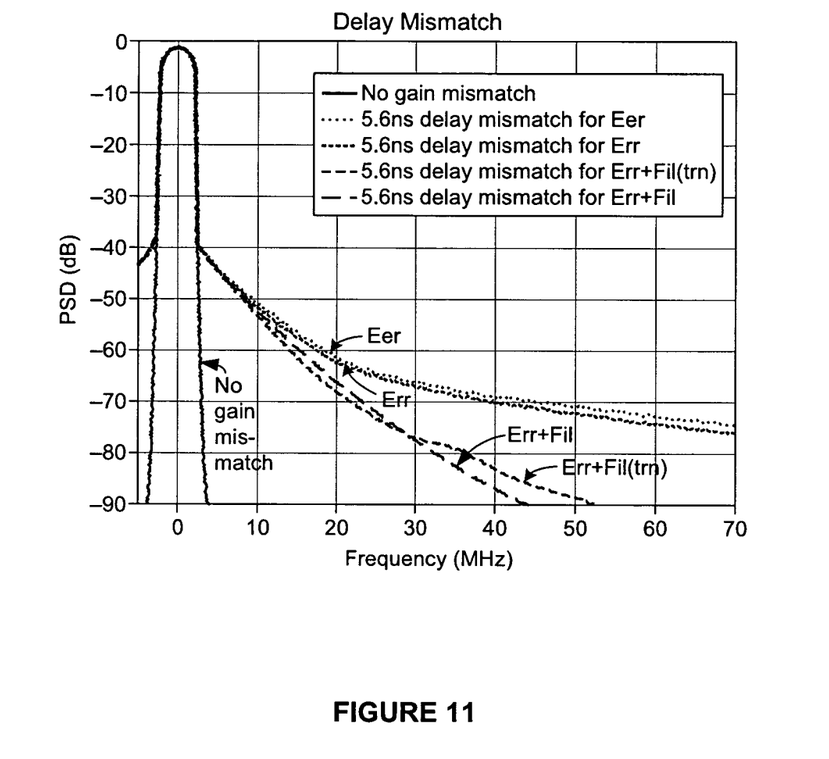
FIG. 11 is a graph comparing the effects of simulated delay mismatch between signals applied to the power supply and RF input ports of the PA of the multi-mode communications transmitter in FIG. 3 for: a conventional EER-based approach, an ERR approach combined with filtering transitions only (as in FIG. 5 above), and an ERR approach combined with filtering at all times.

Compared to communications transmitters that operate on EER or ERR-only principles, the combined ERR+filtering approach employed by the signal decomposition methods and apparatus of the present invention results in a communications transmitter that is more forgiving to delay and gain mismatches between separate modulation paths leading to the PA 310. This advantage is illustrated in the PSD simulation results in FIGS. 10 and 11, which compare the output power of the PA of various communication transmitter approaches configured to transmit W-CDMA signals. In the figures, the effects on the PSD due to a 20% gain mismatch (FIG. 10) and a 5.6 ns delay mismatch (FIG. 11) between signals applied to the power supply and RF input ports of the PA are compared for: 1) a conventional EER-based approach ("Eer"), 2) an ERR-only approach ("Err"), 3) an ERR approach combined with filtering transitions only ("Err+Fil(trn)") (as in FIG. 5 above), and 4) an ERR approach combined with filtering at all times ("Err+Fil"). As can be seen, when using either of the Err+Fil(trn) or Err+Fil approaches of the present invention, the PA output power is substantially lower for frequency deviations above about 10 MHz from the channel center frequency (normalized to 0 MHz in the drawing) compared to when the Err-only approach ("Err") is used. Considering that W-CDMA utilizes a 5 MHz channel spacing, a substantial reduction in spectral regrowth can be achieved in W-CDMA applications by using either of the Err+Fil(trn) or Err+Fil approaches.

Although the present invention has been described with reference to specific embodiments, these embodiments are merely illustrative and not restrictive of the present invention. Further, various modifications or changes to the specifically disclosed exemplary embodiments will be suggested to persons skilled in the art and are to be included within the spirit and purview of this application and scope of the appended claims.

What is claimed is:

1. A multi-mode communications transmitter, comprising: a signal decomposer, including a cordic converter and a bandwidth reduction unit, said cordic converter configured to convert rectangular-coordinate in-channel (I) and quadrature channel (Q) signals into polar-coordinate amplitude and angle component signals, said bandwidth reduction unit configured to form a first modulation signal from the polar-coordinate amplitude component signal, wherein the first modulation signal has a reduced bandwidth compared to a bandwidth of the polar-coordinate amplitude component signal, wherein said signal decomposer further includes a filter mad a threshold detector configured to detect times when an amplitude represented in said polar-coordinate amplitude component signal exceeds a predetermined amplitude threshold, said threshold detector is further configured to generate an amplitude varying signal representing amplitude information exceeding said amplitude threshold and said filter is configured to reduce the bandwidth of said signal representing amplitude information exceeding said amplitude threshold; a signal combiner configured to form a second modulation signal from a combination of said amplitude and angle component signals, said second modulation signal representing amplitude information falling below said amplitude threshold and angle information in said angle component signal; a power supply controller configured to generate a power supply signal from said first modulation signal; a quadrature modulator configured to form a modulated RF carrier based on said second modulation signal; and an amplifier having a power supply port configured to receive said power supply signal and an RF input port configured to receive said modulated RF carrier signal.

2. The multi-mode communications transmitter of claim 1 wherein the amplitude of said amplitude component signal is used to determine which one of a plurality of different operating modes that the multi-mode communications transmitter is to be configured to operate.

3. The multi-mode communications transmitter of claim 2 wherein said plurality of different operating modes includes a polar mode and a quadrature mode.

4. The multi-mode communications transmitter of claim 2 wherein said plurality of different operating modes further includes a hybrid mode in which both the power supply signal and the modulated RF carrier signal will have nonconstant envelopes.

5. The multi-mode communications transmitter of claim 1 wherein said filter is configured to filter only during times when sharp transitions are found to be represented in said signal representing amplitude information.

6. A multi-mode communications transmitter, comprising: a signal decomposer, including a cordic converter, a bandwidth reduction unit, said cordic converter configured to convert rectangular-coordinate in-channel (I) and quadrature channel (Q) signals into polar-coordinate amplitude and angle component signals, said bandwidth reduction unit configured to form a first modulation signal from the polar-coordinate amplitude component signal, wherein the first modulation signal has a reduced bandwidth compared to a bandwidth of the polar-coordinate amplitude component signal, wherein said bandwidth reduction unit is further configured to form a second modulation signal from the polar-coordinate angle component signal, wherein the second modulation signal has a reduced bandwidth compared to a bandwidth of the polar-coordinate angle component signal, and a threshold detector is further configured to generate an amplitude varying signal representing amplitude information falling below said amplitude threshold, wherein said signal decomposer further includes a filter configured to reduce the bandwidth of said signal representing amplitude information falling below said amplitude threshold to form a bandwidth-reduced signal representing amplitude information falling below said amplitude threshold; a signal combiner configured to form said second modulation signal from said angle component signal and said bandwidth-reduced signal representing amplitude information falling below said amplitude threshold; a power supply controller configured to generate a power supply signal from said first modulation signal; a quadrature modulator configured to form a modulated RF carrier based on said second modulation signal; and an amplifier having a power supply port configured to receive said power supply signal and an RF input port configured to receive said modulated RF carrier signal.

7. The multi-mode communications transmitter of claim 6 wherein the amplitude of said amplitude component signal is used to determine which one of a plurality of different operating modes that the multi-mode communications transmitter is to be configured to operate.

8. The multi-mode communications transmitter of claim 7 wherein said plurality of different operating modes includes a polar mode and a quadrature mode.

9. The multi-mode communications transmitter of claim 7 wherein said plurality of different operating modes further includes a hybrid mode in which both the power supply signal and the modulated RF carrier signal will have nonconstant envelopes.

10. The multi-mode communications transmitter of claim 6 wherein said filter is configured to filter only during times when sharp transitions are found to be represented in said signal representing amplitude information.

11. A method of controlling the bandwidth of signals in a communications transmitter, comprising: generating polar-coordinate amplitude and angle component signals from rectangular-coordinate in-channel (I) and quadrature channel (Q) signals; forming a first modulation signal from the polar-coordinate amplitude component signal, wherein the first modulation signal has a reduced bandwidth compared to a bandwidth of the polar-coordinate amplitude component signal; forming a second modulation signal from the polar-coordinate angle component signal, wherein the second modulation signal has a reduced bandwidth compared to a bandwidth of the polar-coordinate angle component signal; wherein decomposing said amplitude and angle component signals into first and second modulation signals includes: detecting times when amplitude information represented in said amplitude component signal exceeds a predetermined amplitude threshold, forming a first signal representing amplitude information in said amplitude component signal exceeding said predetermined amplitude threshold and a second signal representing amplitude information in said amplitude component signal not exceeding said predetermined amplitude threshold, reducing the bandwidth of said second signal representing amplitude information in said amplitude component signal, when not exceeding said predetermined amplitude threshold, to form a bandwidth-reduced signal representing amplitude information in said amplitude component signal not exceeding said predetermined threshold, and combining said bandwidth-reduced signal representing amplitude information in said amplitude component signal, not exceeding said predetermined amplitude threshold, with said angle component signal to form said second modulation signal, forming a power supply signal from a direct current power supply and said first modulation signal; forming a modulated radio frequency (RF) carrier signal based on said second modulation signal; and amplifying said modulated RF carrier signal using an amplifier powered by said power supply signal.

12. The method of claim 11 wherein decomposing said amplitude and angle component signals is performed in accordance with a plurality of different modes in which the communications transmitter is configurable to operate.

13. The method of claim 12 wherein the plurality of different modes comprises a quadrature mode, a polar mode and a hybrid mode.

* * * * *